(12) United States Patent
Qiu et al.

(10) Patent No.: US 9,030,059 B2
(45) Date of Patent: May 12, 2015

(54) ACTUATOR

(75) Inventors: Miao Xuan Qiu, Shenzhen (CN); Ning Huang, Shenzhen (CN); Soeren Heinrich, Dresden (DE)

(73) Assignee: Johnson Electric S.A., Murten (CH)

( * ) Notice: Subject to any disclaimer, the term of this patent is extended or adjusted under 35 U.S.C. 154(b) by 373 days.

(21) Appl. No.: 13/478,516

(22) Filed: May 23, 2012

(65) Prior Publication Data

US 2012/0299411 A1  Nov. 29, 2012

(30) Foreign Application Priority Data

May 23, 2011  (CN) .......................... 201120182049

(51) Int. Cl.
| | |
|---|---|
| *G03B 9/02* | (2006.01) |
| *H02K 33/16* | (2006.01) |
| *H02K 3/52* | (2006.01) |
| *H02K 21/02* | (2006.01) |
| *G03B 9/00* | (2006.01) |
| *G03B 11/00* | (2006.01) |
| *H02K 5/22* | (2006.01) |
| *H02K 11/00* | (2006.01) |
| *H02K 15/02* | (2006.01) |

(52) U.S. Cl.
CPC ............... *H02K 3/522* (2013.01); *H02K 5/225* (2013.01); *H02K 11/0073* (2013.01); *H02K 15/022* (2013.01); *H02K 21/02* (2013.01); *H02K 2203/03* (2013.01); *G03B 9/00* (2013.01); *G03B 11/00* (2013.01); *G03B 2205/0069* (2013.01)

(58) Field of Classification Search
USPC ........ 310/36, 38; 396/463, 465, 508; 335/272
See application file for complete search history.

(56) References Cited

U.S. PATENT DOCUMENTS 5,262,812 A * 11/1993 Fukasawa ..................... 396/455
5,689,746 A * 11/1997 Akada et al. .................. 396/508
6,960,848 B2 * 11/2005 Naganuma et al. ............ 310/37
6,981,807 B2 * 1/2006 Naganuma et al. .......... 396/463

(Continued)

FOREIGN PATENT DOCUMENTS

| JP | 05-273630 | * 10/1993 | ............... G03B 9/02 |
| JP | 2001045719 | 2/2001 | |

(Continued)

OTHER PUBLICATIONS

English Machine Translation, JP 2008-185975, Negishi et al., Aug. 2008.*
English Machine Translation, JP 2003-142317, Sato et al., May 2003.*

*Primary Examiner* — Burton Mullins
(74) *Attorney, Agent, or Firm* — Muncy, Geissler, Olds & Lowe, P.C.

(57) ABSTRACT

An actuator includes a stator and a movable component movably mounted in the stator. The stator includes a yoke, a printed circuit board disposed at one axial end of the yoke, a bobbin mounted inside the yoke, windings wound about the bobbin; and multiple terminals mounted to the bobbin to electrically connect the windings ends to the printed circuit board. The bobbin includes a plurality of spaced extending portions extending towards the printed circuit board. The terminals are mounted to a respective end of the extending portions of the bobbin that face the printed circuit board. The terminals are spaced from the yoke. A free length of the terminal between the bobbin and the printed circuit board is short enough to avoid bending which may result in a short circuit between the terminals and the yoke.

17 Claims, 5 Drawing Sheets

(56) References Cited

U.S. PATENT DOCUMENTS

| | | | |
|---|---|---|---|
| 7,513,703 B2 * | 4/2009 | Yasuyuki | 396/508 |
| 7,625,142 B2 * | 12/2009 | Fukasawa | 396/506 |
| 7,685,698 B2 * | 3/2010 | Amino et al. | 29/607 |
| 7,781,924 B2 * | 8/2010 | Mizumaki | 310/49.35 |

FOREIGN PATENT DOCUMENTS

| | | | | |
|---|---|---|---|---|
| JP | 3090614 | | 12/2002 | |
| JP | 2003-142317 | * | 5/2003 | H01F 27/06 |
| JP | 2004-336940 | * | 11/2004 | H02K 33/00 |
| JP | 2008-185975 | * | 8/2008 | G03B 9/02 |

* cited by examiner

//=

ACTUATOR

CROSS REFERENCE TO RELATED APPLICATIONS

This non-provisional patent application claims priority under 35 U.S.C. §119(a) from Patent Application No. 201120182049.5 filed in The People's Republic of China on May 23, 2011.

FIELD OF THE INVENTION

This invention relates to actuators, in particular to actuators for driving a camera iris, shutter or filter.

BACKGROUND OF THE INVENTION

A typical camera actuator is shown in FIGS. 7 and 8 and includes an annular yoke (not shown), a bobbin 22' mounted inside the yoke, a coil 24' wound on the bobbin 22', a movable component installed inside the bobbin 22', a mounting seat 28' mounted at one end of the bobbin 22', and a PCB 31' connected to the mounting seat 28' and disposed at one end of the yoke. A pair of arms 38' is mounted to the movable component and extends out of the bobbin to drive an object to be driven by the actuator, such as a shutter. Terminals 26' are fixed to one axial end of the bobbin 22'. The coil 24' is electrically connected to the terminals 26' by winding the coil wire end 25' about the terminals 26'. The terminals 26' are also connected to the PCB 31' for electrically connecting the windings 24' to circuits of the PCB 31'. The terminals 26' extend axially and are disposed around the mounting seat 28'.

The free length of the terminal 26' which is exposed between the bobbin 22' and the PCB 31' is too long, such that the terminal 26' is easily bent since the terminal 26' is thin. Further, the yoke, or at least the inner surface there of, should be insulated to avoid a short circuit risk between the terminals 26' and the yoke, resulting in a high cost of the actuator due to the insulating treatment.

Other problem to be solved is that the coil wires are easily broken. In these actuators, the insulated coil wires are very thin and are at risk of being cut or damaged during assembly, e.g. during fitting of the reset magnet 29'. Because of the small wire gauges the stress caused by thermal or mechanical influences may cause the wire to break, especially at a location which has been damaged. Since the axial end of the bobbin where the terminals are fixed and the reset magnet 26' receiving hole is formed, is flat, the coil wire ends 25' located close to the reset magnet receiving hole are liable to be cut or damaged by the reset magnet 29' during assembly.

Therefore, it is desired to develop an improved actuator which can solve the above mentioned problems.

SUMMARY OF THE INVENTION

Accordingly, the present invention provides an actuator comprising: a stator and a movable component movably mounted in the stator, the stator comprising: a yoke; a printed circuit board disposed at one axial end of the yoke; a bobbin mounted inside the yoke, the bobbin having a plurality of spaced extending portions extending towards the printed circuit board; at least one winding, having coils ends, wound about the bobbin; and a plurality of terminals mounted to respective ends of the extending portions of the bobbin that face the printed circuit board, the terminals being spaced from the yoke and electrically connecting the coil ends to the printed circuit board, a free length of the terminal between the bobbin and the printed circuit board being short enough to avoid bending which may result in a short circuit between the terminals and the yoke.

Preferably, the free length of the terminal is not more than three times the largest outer diameter of the terminal.

Preferably, the free length of the terminal is not more than two times the largest outer diameter of the terminal.

Preferably, the extending portions contact the printed circuit board, each of the extending portions has a cutout in an end facing the printed circuit board, and the terminal extends out of the extending portion at the cutout, the cutout accommodating the connection between the terminal and the respective coil end.

Preferably, a reset magnet is provided and the bobbin comprises a groove for receiving the reset magnet, and an open end of the groove is spaced from the axial end of the extending portion in the axial direction of the bobbin by a predetermined distance.

Preferably, the stator comprises a mounting seat mounted to one end of the bobbin, and the printed circuit board is fixed to the mounting seat.

Preferably, the mounting seat comprises extensions that are press fits between the extending portions of the bobbin.

Preferably, the bobbin comprises a main body having a recess for receiving the movable component and a cover mounted at an open end of the main body.

Preferably, the movable component comprises a shaft, a magnet body fixed to the shaft and at least one arm extending out of the bobbin from a groove defined between the main body and the cover.

Preferably, the magnet body comprises an annular permanent magnet fitted to a core.

Preferably, the at least one winding comprises a drive winding and a sense winding, the bobbin having two channels for accommodating the two windings.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
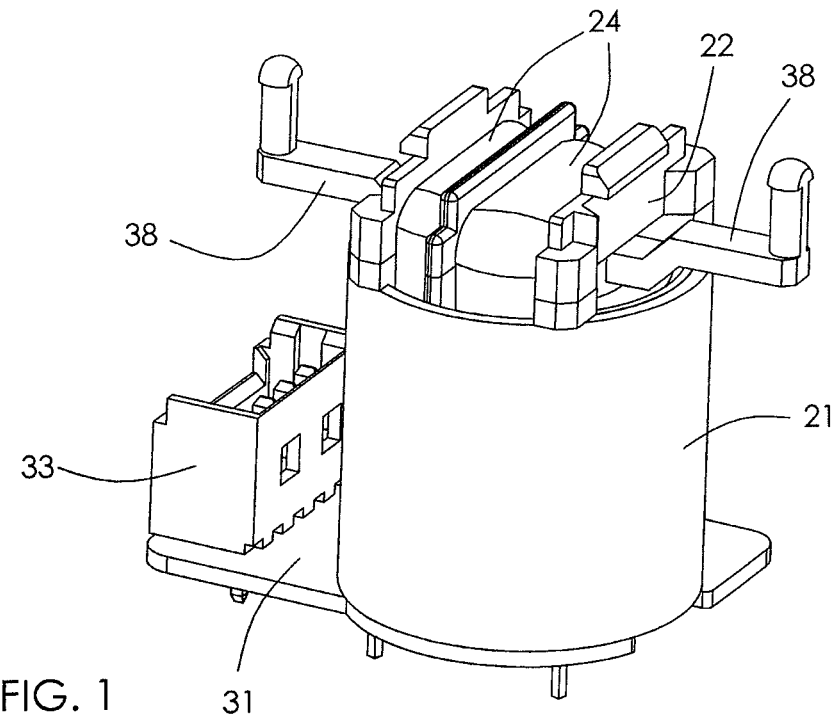
FIG. 1 is a view of an assembled actuator according to one embodiment of the present invention.
Figure 2:
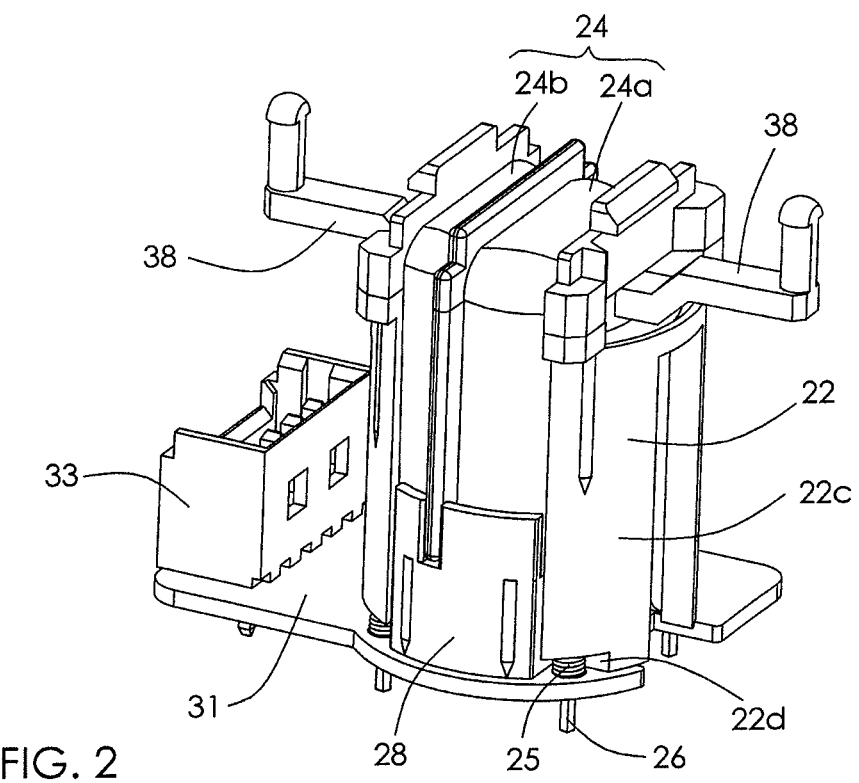
FIG. 2 is a view similar to FIG. 1, but with the yoke removed to show an interior structure of the actuator.
Figure 3:
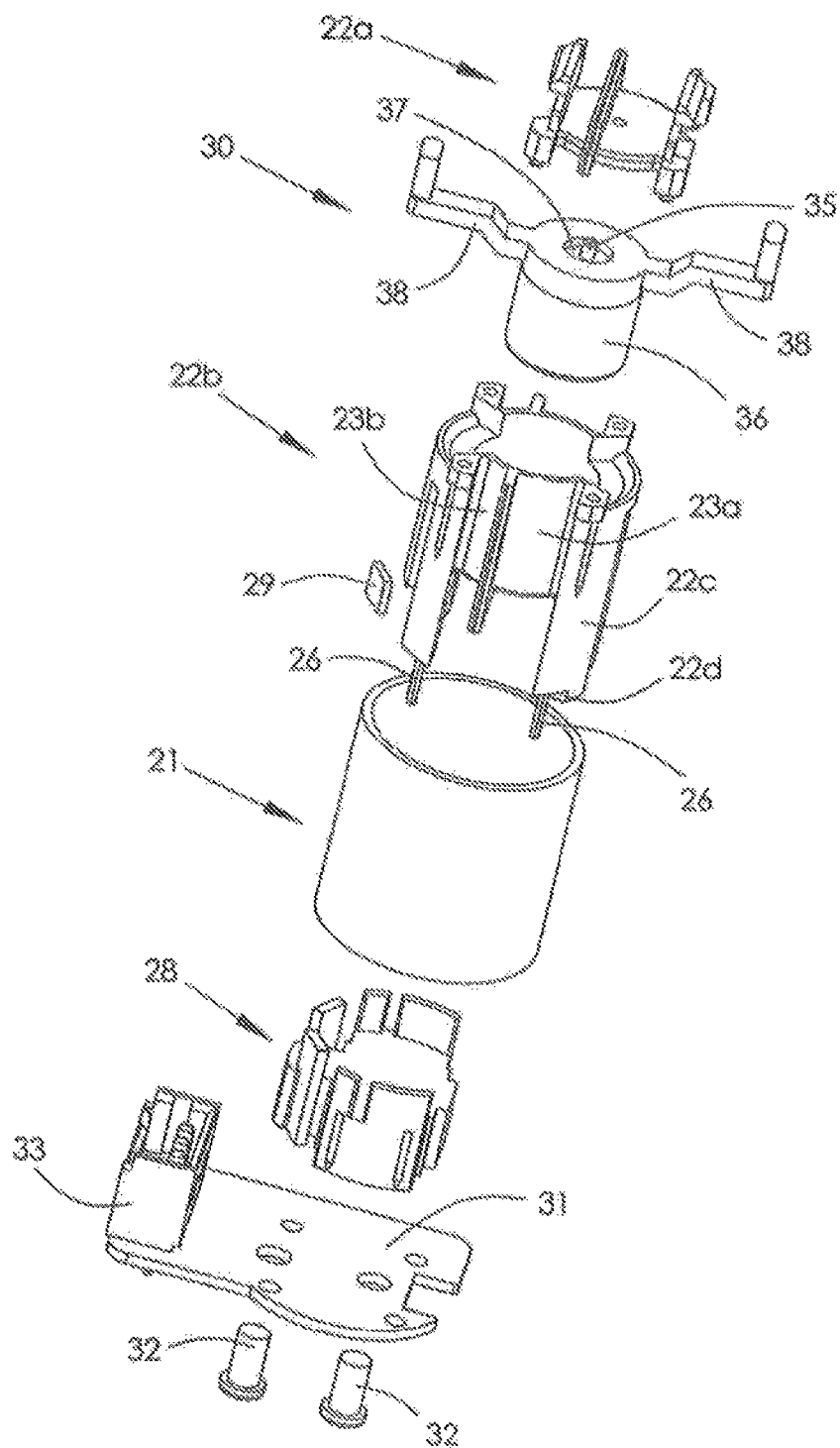
FIG. 3 is an exploded view of the actuator of FIG. 1, with the coils omitted.

Referring to FIGS. 1 to 6, an actuator for driving an object, such as camera iris, shutter, or filter, has a stator. The stator includes an annular yoke 21, a bobbin 22 mounted in the yoke 21, windings 24 wound on the bobbin 22, and a PCB 31 disposed at one end of the yoke 21. The PCB 31 includes circuits (not shown) and a connector 33 for connecting to an external power source.

The PCB 31 is fixed to the yoke 21 by a mounting seat 28, which is disposed at one end of the bobbin 22 and fixed to the bobbin 22. The PCB 31 is fixed to the mounting seat 28 by fasteners 32, such as screws. The fasteners 32 extend through the PCB 31 and engage with the mounting seat 28 to thereby fix the PCB 31 to the mounting seat 28.

The bobbin 22 includes a plurality of, four in this embodiment, integrally formed spaced extending portions 22c, each of which extends axially and reaches the PCB 31. The mounting seat 28 has extensions that engage the extending portions 22c, preferably by being a slight press fit between the extending portions 22c so as to fix the mounting seat 28 to the bobbin 22.

Each extending portion 22 includes a small cutout 22d formed in the end contacting the PCB 31. The stator includes four terminals 26, each of which is embedded or inserted inside the extending portion 22c and extends out of the extending portion 22c at the cutout 22d. Coil ends 25 of the windings 24 (see FIG. 4) extend axially to the cutout 22d and are wound about the terminals 26. In particular, the coils ends are wound about the portion of the terminals exposed by the cutouts. The coil ends 25 are electrically connected to corresponding terminals 26. Soldering or welding could be used to fix the coil end 25 to the corresponding terminal 26.

The terminals 26 pass through apertures formed in the PCB 31. Connection between the terminals 26 and the circuits in PCB 31 can be achieved by soldering or welding the terminals 26 onto the PCB 31. Due to the cutouts 22d, a risk of damaging or cutting the coil ends 25 during fitting of the PCB 31 is eliminated, thus improving the reliability of the actuator.

In this embodiment, the terminals 26 are spaced from the inner surface of yoke 21 by a predetermined distance. The free length of the terminals 26, between the extending portions and the PCB, is short enough to avoid bending. Thus, the short circuit risk between the terminals 26 and the yoke 21 is eliminated. Therefore, the yoke 21 can be made of electric conducting material and insulating treatment is not required. Thus the cost of handling and manufacturing the yoke is significantly reduced.

Preferably, the free length is less than or equal to two times or three times of the largest outer diameter of the terminal, as long as the free length is short enough for preventing the terminals 26 from electrically contacting the yoke 21. As described above, the free length is basically the depth of the cutout 22d.

The actuator also has a movable component 30 rotatably mounted inside the bobbin 22. The movable component 30 includes a shaft 35, a magnet body 36 fixed on the shaft 35 and at least one arm 38. In this embodiment, the movable component 30 includes a pair of arms 38 arranged symmetrically. The magnet body 36 comprises an annular or ring type permanent magnet fixed to a core 37 that is press fitted onto the shaft. The windings 24 include a drive winding 24a for driving the movable component 30 and a sense winding 24b for sensing any actuator movement. Alternatively, an arrangement having only the drive winding 24a is possible depending on the actuator requirements. It should be noted that in the exploded view of FIG. 3, the windings 24 have been omitted. Channels 23a & 23b are provided in the bobbin for receiving the drive winding 24a and the sense winding 24b, respectively.

The bobbin 22 includes a main body 22b and a cover 22a. The main body 22b includes a recess for receiving the movable component 30. The cover 22a is mounted to an open end (the upper end as viewed in FIG. 3) of the recess after the movable component 30 has been assembled to the main body 22b. In an assembled state, the shaft 35 of the movable component 30 is rotatably supported by the main body 22b and the cover 22a. The two arms 38 extend out of the bobbin 22 through a pair of slots defined between the main body 22b and the cover 22a.

Figure 4:
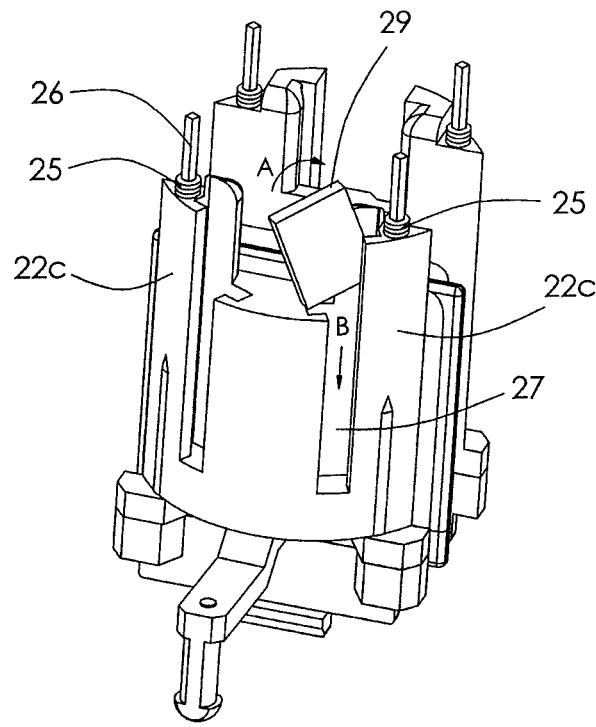
FIG. 4 is a view from below of the bobbin of FIG. 1, illustrating how a reset magnet is fitted to the bobbin.

A plurality of axial grooves 27 are formed in the bobbin 22, and a reset magnet 29 is inserted into one of the grooves 27 from an open end of the groove 27. The open end of the groove 27 is spaced from the axial end of the extending portion 22c in the axial direction of the bobbin by a predetermined distance, such that the reset magnet 29 will not touch the adjacent terminal 26 or the coil end 25 during insertion. As shown in FIG. 4, the reset magnet 29 is firstly positioned slightly rotated with a lower corner entering the groove 27. The magnet is then rotated as indicated by arrow A to the vertical orientation so that a side edge is flat against the side of the extending portion 22c. In this position the magnet is close to the terminal and coil end but does not touch the coil end or terminal as the lower corner is already located within the groove. The magnet is then pressed into the groove as indicated by the arrow B, to be seated at the bottom of the groove 27.

In this embodiment, each extending portion 22c includes an axial hole for the insertion of a terminal 26. Preferably, the hole is circular and the terminal 26 has a rectangular cross section with the terminal 26 being a slight press fit with the hole. Ribs are provided on the outer surface of the bobbin and seat to create a tight connection with the yoke. Snap fit detents are provided on the bobbin cover 22a for easy mounting of the actuator, by pressing the detents through slots formed in a mounting plate or the like.

Figure 5:
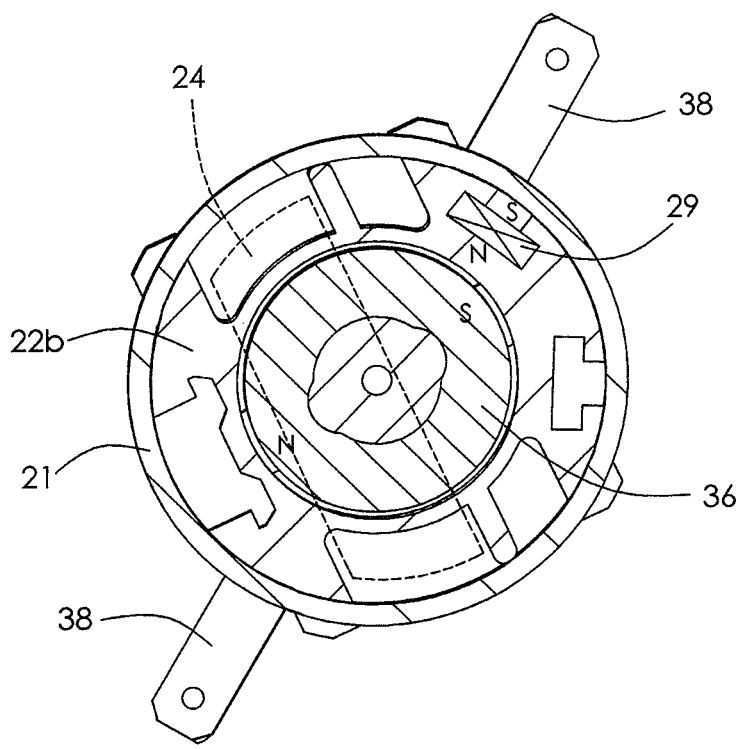
FIGS. 5 & 6 illustrate respectively the initial position and the working position of a movable component.
Figure 6:
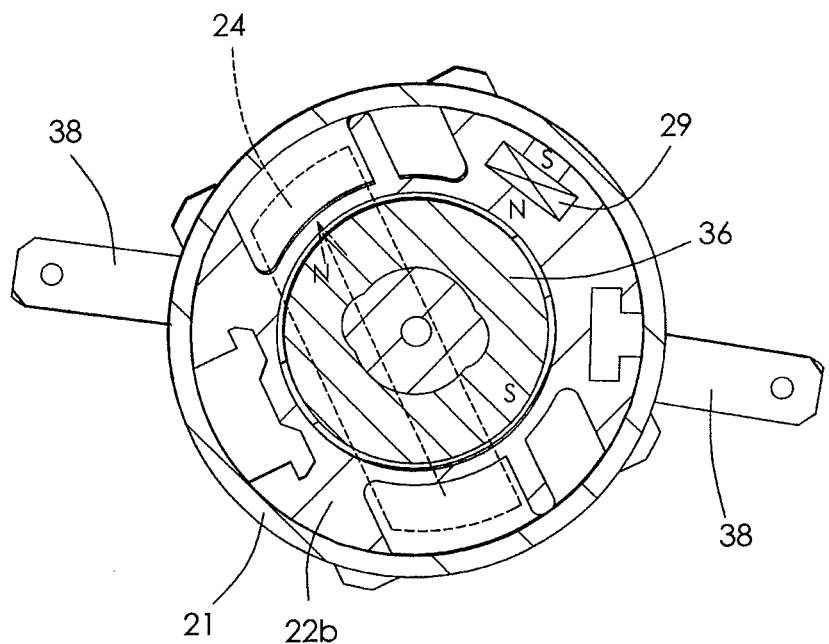
Figure 7:
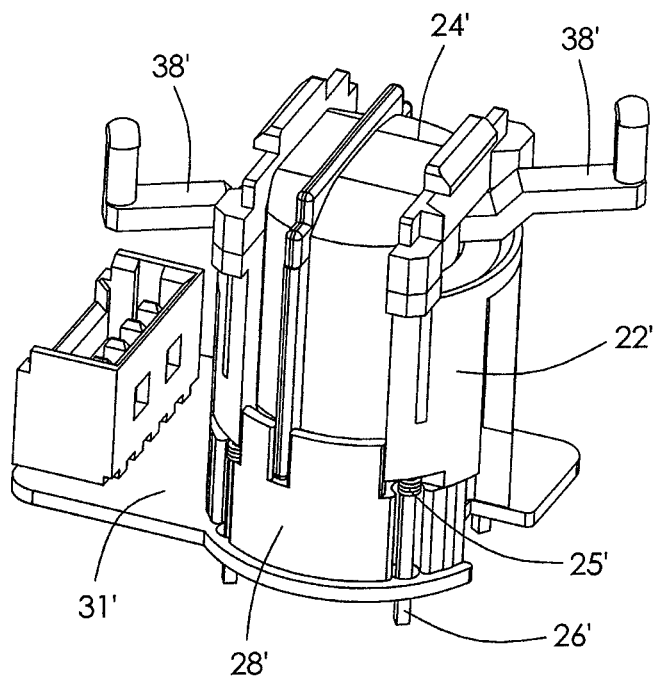
FIG. 7 is a view of a prior art actuator, with the yoke omitted.
Figure 8:
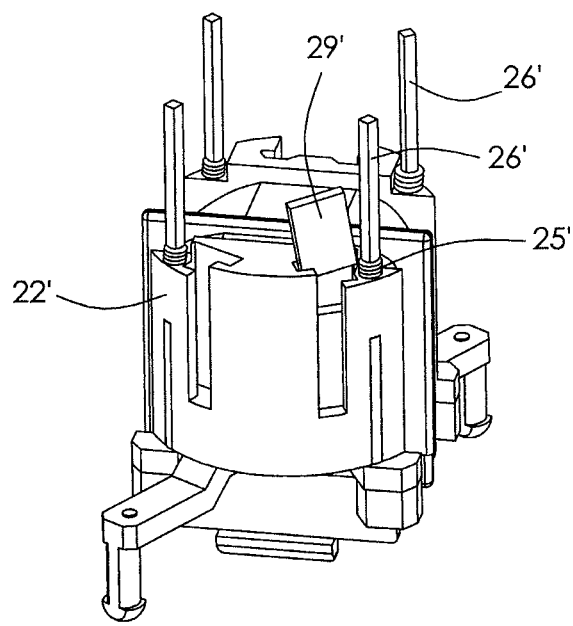
FIG. 8 is a view from below of the bobbin of the actuator of FIG. 7, illustrating how the reset magnet is fitted to the bobbin.

When the drive winding 24a is not energized, the movable component 30 holds at an initial position shown in FIG. 5, due to the attraction from the reset magnet 29. When the drive winding 24a is energized, the movable component 30 rotates and finally holds at a working position shown in FIG. 6, due to the magnetic flux generated by the drive winding 24a. When the current is cut off, the movable component 30 returns to the initial position shown in FIG. 5 due to the attraction from the reset magnet 29.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. An actuator comprising:
  a stator and a movable component movably mounted in the stator, the stator comprising:
  a yoke;
  a printed circuit board disposed at one axial end of the yoke;
  a bobbin mounted inside the yoke, the bobbin forming a plurality of spaced extending portions reaching the printed circuit board, each of the extending portions defining a cutout at an end facing the printed circuit board;

windings wound about the bobbin; and a plurality of terminals mounted to respective ends of the extending portions of the bobbin that face the printed circuit board, the terminals being spaced from the yoke, extending out of the extending portion at the cutout, and electrically connecting the windings ends to the printed circuit board.

2. The actuator of claim 1, wherein the free length of the terminal is not more than a length that is that is three times of the largest outer diameter of the terminal.

3. The actuator of claim 1, wherein the free length of the terminal is not more than a length that is two times of the largest outer diameter of the terminal.

4. The actuator of claim 1, further comprising a reset magnet, wherein the bobbin comprises a groove for receiving the reset magnet, and an open end of the groove is spaced from the axial end of the extending portion in the axial direction of the bobbin by a predetermined distance.

5. The actuator of claim 1, wherein the stator comprises a mounting seat mounted at one end of the bobbin, and the printed circuit board is fixed to the mounting seat.

6. The actuator of claim 5, wherein the mounting seat comprises extensions that are press fits between the extending portions of the bobbin.

7. An actuator according to any one of the preceding claims, wherein the bobbin comprises a main body having a recess for receiving the movable component and a cover mounted at an open end of the main body.

8. The actuator of claim 7, wherein the movable component comprises a shaft, a magnet body fixed to the shaft and at least one arm extending out of the bobbin from a groove defined between the main body and the cover, the magnet body comprising an annular permanent magnet and a core.

9. The actuator of claim 1, wherein the at least one winding comprises a drive winding and a sense winding, and the bobbin has two channels for accommodating the two windings.

10. An actuator comprising:
a stator and a movable component movably mounted in the stator, the stator comprising:
a yoke;
a printed circuit board disposed at one axial end of the yoke;
a bobbin mounted inside the yoke, the bobbin forming a plurality of spaced extending portions reaching the printed circuit board, each of the extending portions defining a cutout at an end facing the printed circuit board;
windings wound about the bobbin; and
a plurality of terminals partly embedded inside the extending portions and spaced from the yoke, the terminals extending out of the extending portion at the cutout, and electrically connecting the windings ends to the printed circuit board, a free length of the terminal being not more than a length that is three times of the largest outer diameter of the terminal.

11. The actuator of claim 10, wherein the free length of the terminal is not more than a length that is two times of the largest outer diameter of the terminal.

12. The actuator of claim 10, further comprising a reset magnet, wherein the bobbin comprises a groove for receiving the reset magnet, and an open end of the groove is spaced from the axial end of the extending portion in the axial direction of the bobbin by a predetermined distance.

13. The actuator of claim 10, wherein the stator comprises a mounting seat mounted at one end of the bobbin, and the printed circuit board is fixed to the mounting seat.

14. The actuator of claim 13, wherein the bobbin comprises a plurality of spaced extending portions and the mounting seat comprises extensions engaging with the extending portions of the bobbin.

15. The actuator of claim 10, wherein the bobbin comprises a main body having a recess for receiving the movable component and a cover mounted at an open end of the main body.

16. The actuator of claim 15, wherein the movable component comprises a shaft, a magnet body fixed to the shaft and at least one arm extending out of the bobbin from a groove defined between the main body and the cover.

17. The actuator of claim 10, wherein the at least one winding comprises a drive winding and a sense winding, and the bobbin has two channels for accommodating the two windings.

* * * * *